US012805520B2

(12) United States Patent
Lynch et al.

(10) Patent No.: US 12,805,520 B2
(45) Date of Patent: Nov. 24, 2026

(54) ABRASION RESISTANT BIOCIDAL COMPOSITIONS

(71) Applicant: Stepan Company, Northbrook, IL (US)

(72) Inventors: Christopher Lynch, Chicago, IL (US); Ronald A. Masters, Wheeling, IL (US); Brandon Benko, Racine, WI (US); Vanessa DeMarco, Skokie, IL (US); Alexander Nikoloff, Wheeling, IL (US)

(73) Assignee: Stepan Company, Northbrook, IL (US)

( * ) Notice: Subject to any disclaimer, the term of this patent is extended or adjusted under 35 U.S.C. 154(b) by 488 days.

(21) Appl. No.: 18/371,939

(22) Filed: Sep. 22, 2023

(65) Prior Publication Data

US 2024/0057593 A1 Feb. 22, 2024

Related U.S. Application Data

(63) Continuation of application No. PCT/US2022/022845, filed on Mar. 31, 2022.

(60) Provisional application No. 63/217,609, filed on Jul. 1, 2021, provisional application No. 63/170,181, filed on Apr. 2, 2021.

(51) Int. Cl.

| | |
|---|---|
| ***A01N 33/12*** | (2006.01) |
| ***A01N 25/10*** | (2006.01) |
| ***A01P 1/00*** | (2006.01) |
| ***C11D 3/30*** | (2006.01) |
| ***C11D 3/48*** | (2006.01) |
| ***C11D 17/04*** | (2006.01) |

(52) U.S. Cl.

CPC ............. *A01N 33/12* (2013.01); *A01N 25/10* (2013.01); *A01P 1/00* (2021.08); *C11D 3/30* (2013.01); *C11D 3/48* (2013.01); *C11D 17/041* (2013.01)

(58) Field of Classification Search

CPC .......... A01N 33/12; A01N 25/10; C11D 3/30; C11D 3/48; C11D 17/041

USPC .......................................................... 514/642

See application file for complete search history.

(56) References Cited

U.S. PATENT DOCUMENTS

| | | | |
|---|---|---|---|
| 5,378,406 A | 1/1995 | Nagaoka | |
| 2008/0139443 A1* | 6/2008 | Buzinski | C11D 3/2086 510/362 |
| 2012/0148751 A1 | 6/2012 | Herdt et al. | |
| 2012/0213759 A1 | 8/2012 | Karsten et al. | |
| 2013/0101674 A1 | 4/2013 | Toft | |
| 2016/0022655 A1 | 1/2016 | Veenstra et al. | |
| 2016/0143276 A1 | 5/2016 | Lan et al. | |
| 2017/0280716 A1 | 10/2017 | Lan et al. | |
| 2018/0132481 A1 | 5/2018 | Jiang et al. | |
| 2019/0104731 A1 | 4/2019 | Jiang et al. | |
| 2019/0233769 A1 | 8/2019 | Hayward et al. | |
| 2019/0307124 A1 | 10/2019 | Sehgal et al. | |
| 2020/0253203 A1 | 8/2020 | Sehgal et al. | |
| 2021/0219545 A1 | 7/2021 | Sehgal et al. | |

FOREIGN PATENT DOCUMENTS

| | | | | |
|---|---|---|---|---|
| CN | 111226938 A | 6/2020 | |
| DE | 3702983 A1 | 12/1987 | |
| DE | 102009046215 A1 | 5/2011 | |
| EP | 0252278 A2 * | 1/1988 | A01N 59/00 |
| WO | 2016040230 A1 | 3/2016 | |
| WO | 2019199877 A1 | 10/2019 | |
| WO | 2019199886 | 10/2019 | |
| WO | 2021163269 | 8/2021 | |

OTHER PUBLICATIONS

EP 0252278 machine translation (Year: 1987).*
Extended European Search Report, Application No. PCT/US2022/022845, dated Mar. 3, 2025, 12 pages.
International Search Report and Written Opinion, Application No. PCT/US2022/022845, mailed Sep. 2, 2022, 15 pages.
First Office Action, Chinese Application No. 202280026938.3 dated Jan. 27, 2026, 9 pages.

* cited by examiner

*Primary Examiner* — Yevgeny Valenrod

(74) *Attorney, Agent, or Firm* — McAndrews, Held & Malloy, Ltd.

(57) ABSTRACT

An abrasion resistant biocidal composition is disclosed. The composition includes at least one biocidal quaternary ammonium compound, a polymeric component comprising at least one selected film-forming polymer, and at least one selected organic acid. In some embodiments, the film-forming polymer may be a polyvinylpyrrolidone or chitosan. The organic acid may be methanesulfonic acid, a selected carboxylic acid, a selected amino acid, or a combination thereof. When applied to a surface, the composition forms a film having enhanced durability without imparting poor surface feel or visual effects, and provides biocidal efficacy over an extended period of time.

17 Claims, 6 Drawing Sheets

ABRASION RESISTANT BIOCIDAL COMPOSITIONS

CROSS-REFERENCE TO RELATED APPLICATIONS

This application is a continuation of and claims priority to PCT Application No. US22/022845, filed Mar. 31, 2022, which claims priority to U.S. Provisional Application No. 63/217,609, filed on Jul. 1, 2021 and U.S. Provisional Application No. 63/170,181, filed on Apr. 2, 2021. The entire specifications of the PCT and provisional applications referred to above are hereby incorporated by reference.

FIELD OF THE INVENTION

The present technology relates to biocidal compositions that have enhanced surface durability, and residual biocidal properties. The compositions are useful for disinfecting hard surfaces.

BACKGROUND OF THE INVENTION

Biocidal compositions, which may be, for example, germicides, antimicrobial, antibacterial, antifungal, antispore or antiviral blends, are widely used in different industries, hospitals and institutions as well as in consumers' daily lives to inhibit or kill various microorganisms including, bacteria, yeast, mold, viruses, or other susceptible pathogens (collectively "pathogenic agents"). Biocidal compositions may be formulated for a variety of uses, including hard surface cleaners/disinfectants, hand sanitizers, and medical instrument sterilizers.

A variety of quaternary ammonium compounds have been widely used in biocidal compositions since their introduction as germicides in 1935. The use of quaternary ammonium compounds in biocidal products remains popular primarily because of their relatively broad range of biocidal activity, stability over a large pH range, low toxicity, and low cost. Biocidal products comprising quaternary ammonium compounds have been formulated to provide biocidal efficacy after a contact time (kill time) of 5 minutes or less.

More recently, it has been recognized that the efficacy of biocidal products, such as antimicrobial or disinfectant products can diminish after application because the product fails to remain on the surface being disinfected. For example, the disinfectant composition can be removed through repeated contact or wiping, which can result in a re-contamination of the surface. Product manufacturers have sought to provide biocidal formulations that can remain on the treated surface for longer periods of time and withstand repeated touches. One solution has been to formulate hard surface disinfectants with an oxazoline polymer binder to aid in forming a film on the treated surface. The film can withstand repeated touches and impart residual biocidal properties to the surface. Although such disinfectant compositions can provide extended protection against microbial contamination, they also tend to leave a visual film and impart a gritty or sticky feel to the surface, and/or result in product build-up or reduced surface shine. Therefore, a need remains for a biocidal composition that can provide surface durability without imparting a gritty or sticky surface feel, less visible residue, and which can also provide residual biocidal properties.

BRIEF SUMMARY OF THE INVENTION

The present technology generally relates to one or more biocidal compositions comprising one or more biocidal agents, such as a quaternary ammonium compound or a blend of quaternary ammonium compounds, one or more selected film-forming polymers, and one or more selected organic acids. Surprisingly, it has been found that biocidal compositions comprising both a selected film-forming polymer and at least one selected organic acid can provide enhanced surface durability without imparting poor surface feel or visual effects. The compositions also provide sustained biocidal efficacy over an extended period of time.

One aspect of the present technology is a biocidal composition comprising at least one biocidal quaternary ammonium compound, a polymer component comprising at least one film-forming polymer, at least one organic acid, and a liquid carrier to 100% of the composition. In some embodiments, the composition can be used to sanitize or disinfect hard surfaces.

Another aspect of the present technology is a method for disinfecting surfaces comprising applying to a surface to be disinfected an effective amount of a composition comprising at least one biocidal quaternary ammonium compound, a polymer component comprising at least one film-forming polymer, at least one organic acid, and a liquid carrier to 100% of the composition. The composition can be applied by spraying, mopping, wiping, etc., using any suitable device. In some embodiments, the composition may be applied via a wipe impregnated with the composition.

DETAILED DESCRIPTION OF THE INVENTION

Figure 1:
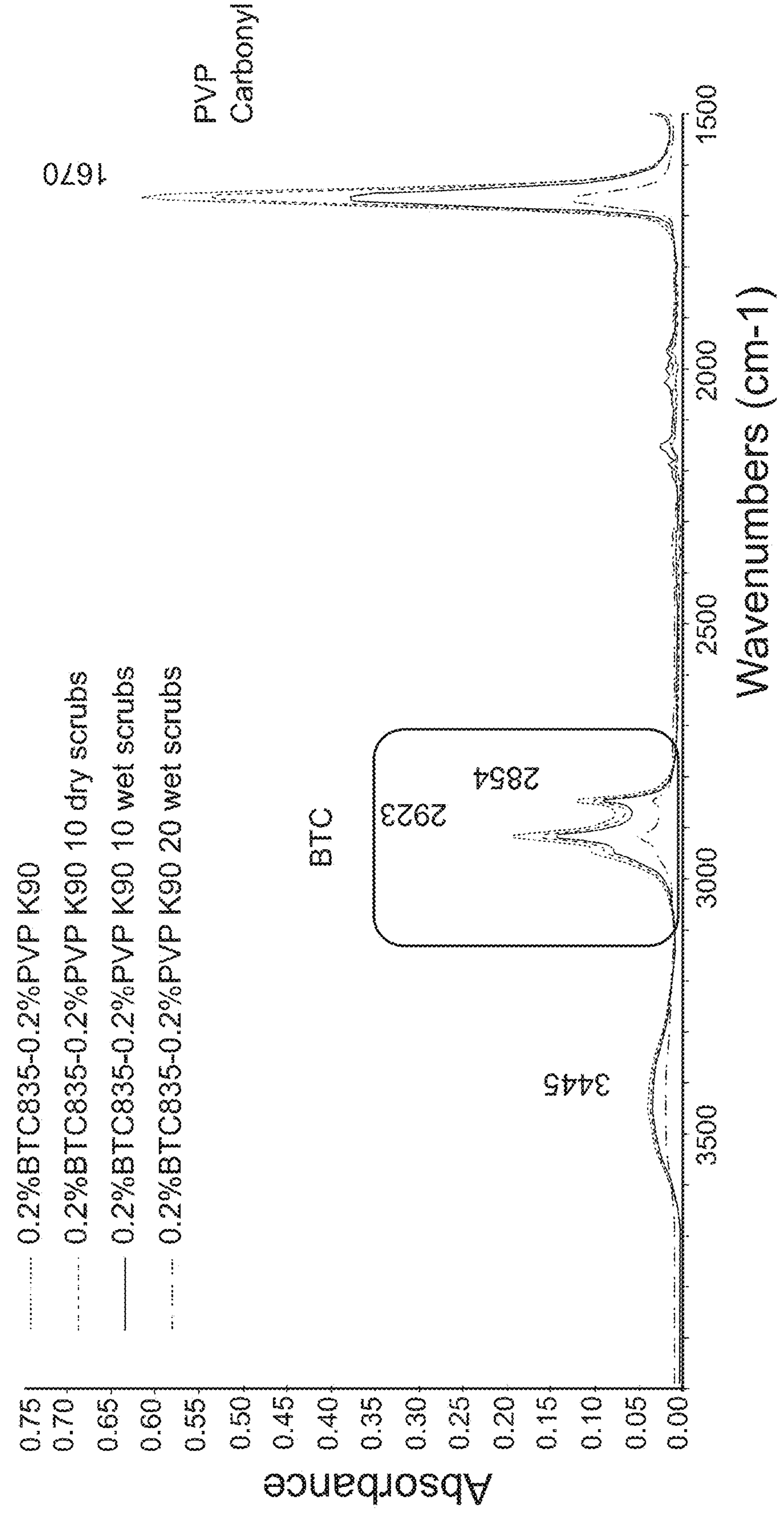
FIG. 1 shows the ATR-FTIR spectra of quaternary ammonium and PVP polymer (0.2 wt %) components of a biocidal composition after dry and wet abrasion testing.
Figure 2:
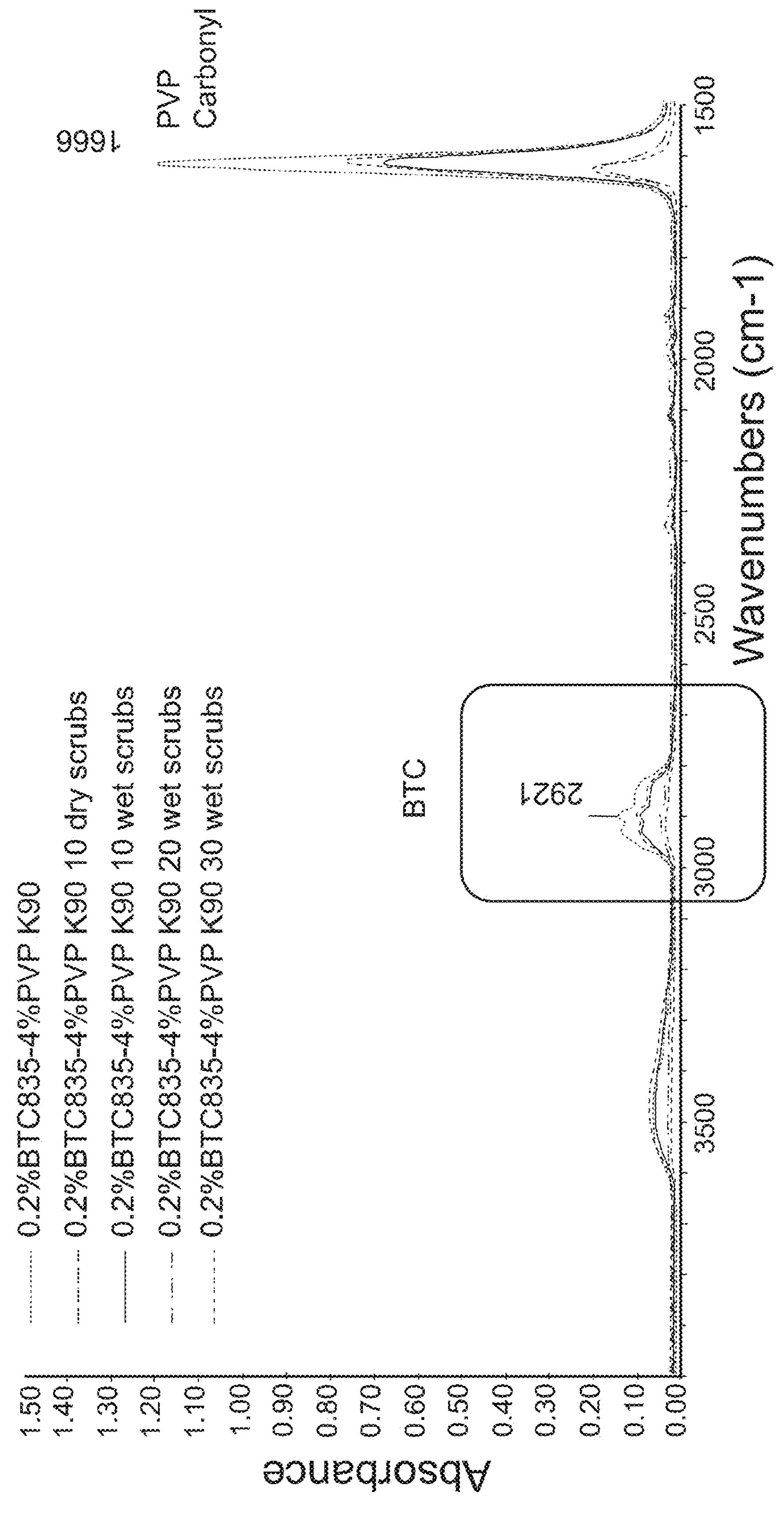
FIG. 2 shows the ATR-FTIR spectra of quaternary ammonium and PVP polymer (4.0 wt %) components of a biocidal composition after dry and wet abrasion testing.
Figure 3:
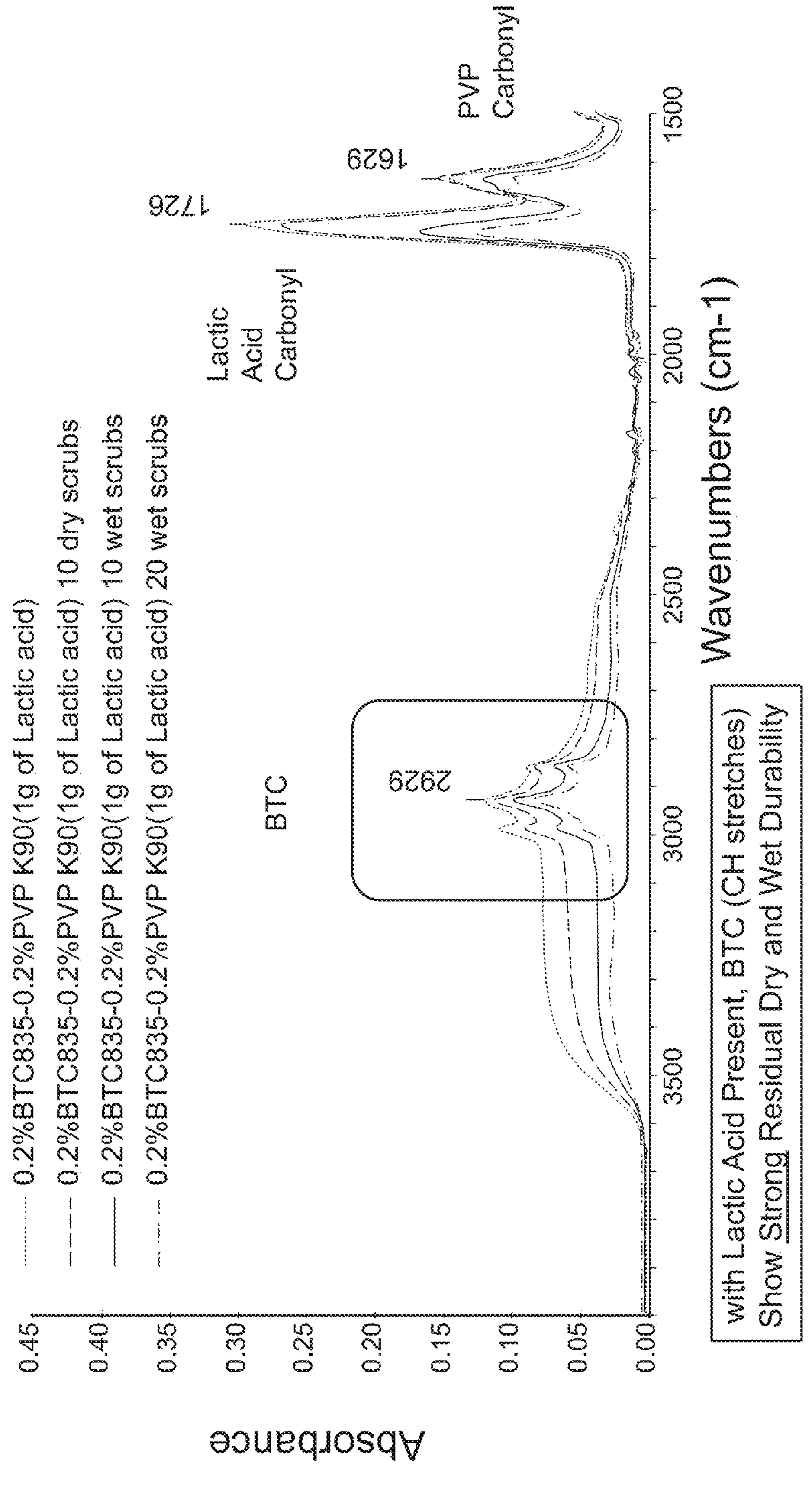
FIG. 3 shows the ATR-FTIR spectra of quaternary ammonium, PVP polymer, and lactic acid components of a biocidal composition after dry and wet abrasion testing.
Figure 4:
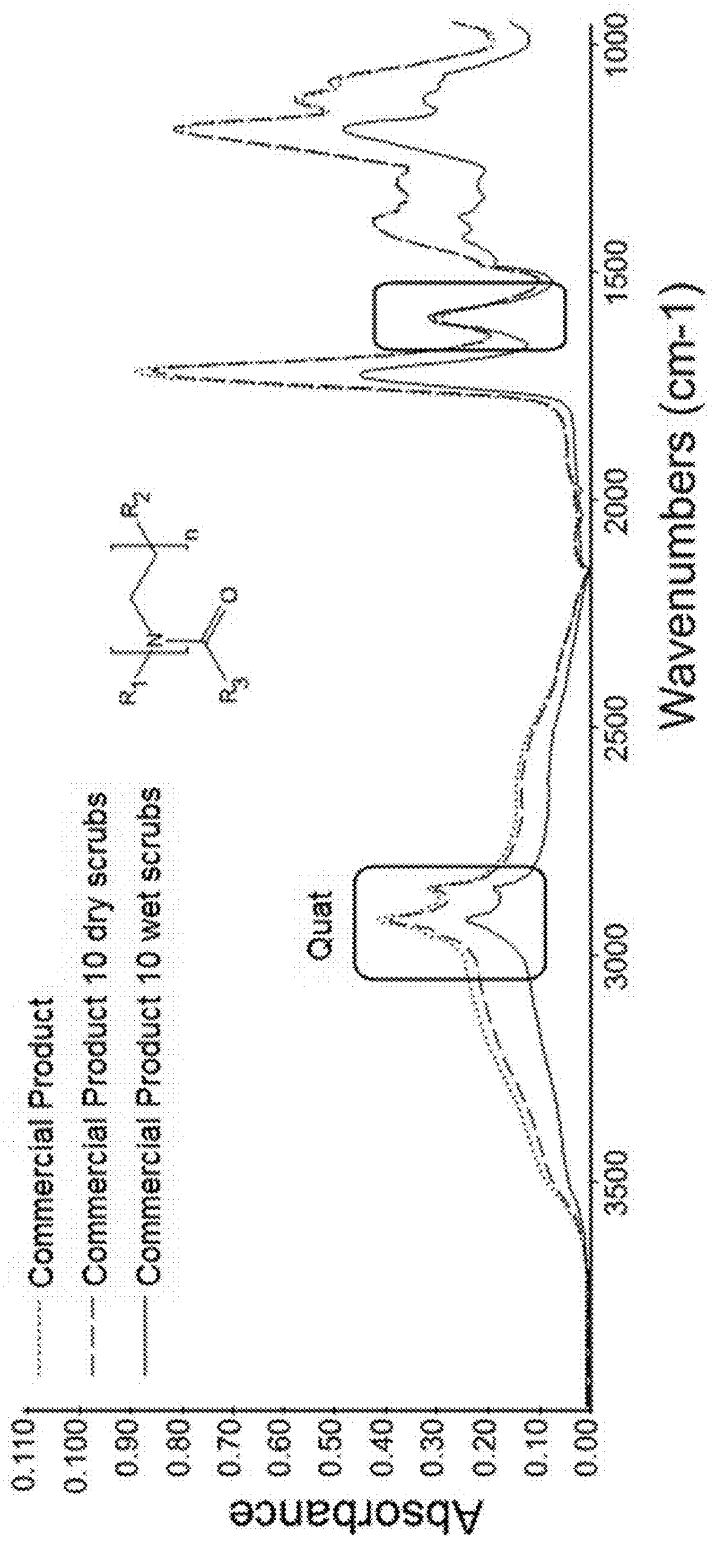
FIG. 4 shows the ATR-FTIR spectra of the components of a leading brand 24-hour anti-bacterial cleaner, after dry and wet abrasion testing.

While the presently described technology will be described in connection with one or more preferred embodiments, it will be understood by those skilled in the art that the technology is not limited to only those particular embodiments. To the contrary, the presently described technology includes all alternatives, modifications, and equivalents that can be included within the spirit and scope of the appended claims.

As used herein, the term "biocidal" means capable of destroying, killing, neutralizing, reducing, eliminating, or inhibiting the growth of bacteria, microorganisms, germs, viruses, spores, molds, yeasts, algae, and/or other susceptible pathogenic agents; biocidal can be, for example, antimicrobial, antibacterial, antifungal, germicidal, sporicidal, antiviral, disinfectant, etc.

"Biocide" means any substance or mixture, in the form in which it is supplied to the user, consisting of, containing or generating one or more active substances, with the intention of destroying, deterring, rendering harmless, preventing the action of, or otherwise exerting a controlling effect on, any pathogenic agent by any means other than mere physical or mechanical action.

"Pathogenic agents" means a harmful entity, including bacteria, fungi, viruses, parasites, such as protozoa, helminths (worms) ectoparasites (lice and fleas), and prions (infectious proteins), which has an unwanted presence or a detrimental effect on the environment, on animals or on humans, their activities, or the products they use or produce.

"Antimicrobial" refers to an agent having effectiveness for controlling the growth of, reducing, and/or killing microbes, such as bacteria, virus, fungi, yeast, algae, cyanobacteria, archaea, prions etc. Antimicrobial further refers to agents capable of controlling the growth of microorganisms that cause odor.

"Disinfectant" and "Sanitizer" refer to an agent, product, or composition that is applied onto objects to reduce and/or destroy microorganisms that are living on the objects.

A "ready-to-use" or "RTU" product, composition or formulation of the present technology refers to a product, composition, or formulation that is ready to be applied to articles, substrates, or surfaces to be biocidally treated and/or disinfected.

A "dilutable," "concentrate," or "dilutable concentrate" product, composition, or formulation of the present technology refers to a product, composition, or formulation that needs to be diluted with a diluent (e.g., water) in a ratio of, for example, 1:32, 1:16, or 1:10, among others, before it can be applied to articles, substrates, or surfaces to be biocidally treated and/or disinfected.

As used herein, a "diluent" or "carrier" means a liquid substance, or mixture of substances, that can be used as a delivery vehicle or carrier to prepare or dilute at least one disinfectant composition of the present technology. A diluent can be, for example, water.

"About" means +/−10% of the referenced value. In certain embodiments, about means +/−5% of the referenced value, or +/−4% of the referenced value, or +/−3% of the referenced value, or +/−3% of the referenced value, or +/−2% of the referenced value, or +/−1% of the referenced value.

The present technology generally relates to biocidal compositions for disinfecting and/or sanitizing surfaces. The biocidal compositions comprise at least one biocidal agent, such as a quaternary ammonium compound or a blend of quaternary ammonium compounds, at least one selected film-forming polymer, and one or more particular organic acids. The selected film-forming polymer and the one or more selected organic acids work synergistically with the biocidal agent to provide enhanced surface durability and residual biocidal properties over an extended period of time. Preferably, the biocidal compositions provide residual biocidal properties for at least 12 hours, more preferably for at least 24 hours.

Quaternary Ammonium Compound

Suitable quaternary ammonium compounds for use herein have the general formula:

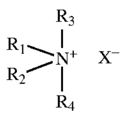

where $R_1$ is a straight or branched, saturated or unsaturated, alkyl or alkene chain having from 6 to 22, preferably from 8 to 18 carbon atoms;.

$R_2$ is a straight or branched, saturated or unsaturated, alkyl or alkene chain having from 1 to 16 carbon atoms, preferably from 1 to 10 carbon atoms;

$R_3$ is methyl, ethyl, benzyl or ethylbenzyl;

$R_4$ is methyl or ethyl; and $$X^- \text{ is: } Cl^-, Br^-, F^-, I^-, (SO_4^{2-})_{\frac{1}{2}}, CH_3OSO_3^-, HCO_3^-, (CO_3^{2-})_{\frac{1}{2}}, CH_2COO^-, \text{ or } C_7H_4NO_3S^-.$$

Exemplary quaternary ammonium compounds within the general formula include alkyl trimethyl ammonium halide, dialkyl dimethyl ammonium halide, alkyl dimethyl benzyl ammonium halide, dialkyl methyl benzyl ammonium halide, alkyl dimethyl ethylbenzyl ammonium halide, and dialkyl methyl ethylbenzyl ammonium halide, alkyl dimethyl benzyl ammonium saccharinate, and dialkyl dimethyl ammonium methyl sulfate. Specific quaternary ammonium salts include didecyl dimethyl ammonium chloride, dioctyl dimethyl ammonium chloride, octyl decyl dimethyl ammonium chloride, ($C_{12}$-$C_{18}$)-alkyl dimethyl benzyl ammonium chloride, and ($C_{12}$-$C_{18}$)-alkyl dimethyl ethylbenzyl ammonium chloride. The quaternary ammonium compound need not be a single entity, but may be a blend of two or more quaternary ammonium compounds. Some specific examples of quaternary ammonium compounds include BTC® 885, a blend of dialkyl dimethyl ammonium chloride and alkyl dimethyl benzyl ammonium chloride, BTC® 888, n-alkyl dimethyl benzyl ammonium chloride and dialkyl dimethyl ammonium chloride (n-alkyl dimethyl benzyl ammonium chloride bended with a mixture of n-octyl decyl dimethyl ammonium chloride, di-n-octyl dimethyl ammonium chloride, and di-n-decyl dimethyl ammonium chloride), and BTC® 835, n-alkyl dimethyl benzyl ammonium chloride (alkyl 50% C14, 40% C12, 10% C16), available from Stepan Company, Northfield, IL.

A biocidal composition of the present technology, in the form of a concentrate, may comprise from about 0.01% to about 30% by weight, based on the total weight of the composition, of quaternary ammonium compound. Alternatively, the quaternary ammonium compound may be present in the biocidal composition in an amount of about 0.02% to about 27% by weight, alternatively about 0.04% to about 20% by weight, alternatively about 0.05% to about 10% by weight, based on the weight of the composition. In some embodiments, the amount of the quaternary ammonium compound is 27% by weight of the total concentrate composition. A biocidal composition of the present technology, in the form of a ready-to-use (or diluted) composition, may comprise from about 100 ppm to about 10,000 ppm, alternatively about 200 ppm, about 300 ppm, about 400 ppm, about 500 ppm, about 600 ppm, or about 700 ppm to about 5000 ppm, about 6000 ppm, about 7000 ppm, or about 8000 ppm, of the quaternary ammonium compound, based on the total weight of the composition. In some embodiments, the amount of the quaternary ammonium compound is about 200 ppm by weight of the ready-to-use composition.

Film-Forming Polymer

The biocidal compositions of the present technology also include a polymer component comprising, consisting of, or consisting essentially of at least one selected film-forming polymer. The film-forming polymer is one that is capable of forming an adherent, flexible, temporary film that can resist dry and wet abrasion on the surface to which it is applied without adversely interfering with the biocidal effectiveness of the biocidal agent. Preferably, the film-forming polymer incorporated into the biocidal composition leaves less visible residue, and does not impart a gritty or sticky feel when the composition is dried on the surface. Film-forming polymers for use in the present technology include polyvinylpyrrolidones and chitosan. In some embodiments, the polymer component consists or consists essentially of polyvinylpyrrolidones or chitosan.

The polyvinylpyrrolidone (PVP) polymers that may be used are those that have a K value in the range of 80 to 100, and a molecular weight of about 1,000,000 to about 1,700,000. PVP polymers having a K value of less than 80, such as a K value of 30 may not provide a film that can resist abrasion. In some embodiments, the film-forming polymer comprises PVP K90.

Chitosan may also be used as the film-forming polymer in the present technology. Chitosan is a linear polysaccharide composed of randomly distributed D-glucosamine units and N-acetyl D-glucosamine units. It is a sustainable bio-polymer based on renewable resources derived from plants or animals. Such polymers can be considered "green" or "natural", since they are derived from renewable and/or sustainable sources. Chitosan for use herein can have a degree of deacetylation (DD %) of 60% or more, alternatively 70% or more, alternatively 80% or more, alternatively 85% or more, alternatively 90% or more. In one embodiment, for example, the biocidal composition contains chitosan having a degree of deacetylation of at least 90%. The degree of deacetylation can be determined by NMR spectroscopy. Deacetylated chitosan is also available from commercial sources. The chitosan may generally have a molecular weight in the medium range, such as in the range of 200,000 to 350,000 daltons. Preferably, the chitosan has a viscosity of 800 cP or less (measured as 1 wt % chitosan in 1 wt % acetic acid at 25° C., with a Brookfield viscometer). Chitosan classified as having a molecular weight in the high range, such as 310,000-375,000 daltons, may not provide acceptable dry abrasion durability.

Chitosan typically requires treatment with a dilute acid to solubilize the chitosan in an aqueous solution. If acid-treated chitosan is used as the film-forming polymer in the biocidal compositions of the present technology, the acid used to solubilize the chitosan should be an organic acid. Surprisingly, it has been found that, if a non-organic acid, such as hydrochloric acid (HCl), is used instead to solubilize the chitosan polymer, a biocidal composition employing such a polymer has poor wet durability. Examples of organic acids that can be used to solubilize the chitosan include, but are not limited to, methanesulfonic acid, carboxylic acids, such as lactic acid, citric acid, acetic acid, gluconic acid, succinic acid, mandelic acid, or adipic acid, or combinations thereof. The amount of organic acid can be in the range of about 0.5 wt % to about 6 wt %, based on the weight of the composition. Alternatively, the acid can be in the range of about 0.6 wt % to about 6 wt %, alternatively about 0.7 wt % to about 5 wt %, alternatively about 0.8 wt % to about 4 wt %, alternatively about 0.9 wt % to about 3 wt %.

The film-forming polymer component may be present in the biocidal composition in an amount of about 0.1 wt % to about 5 wt %. In some embodiments, the amount of film-forming polymer may be about 0.2 wt %. Alternatively, in some embodiments, the amount of the film-forming polymer may be in the range of about 0.2 wt % to about 1 wt % or about 0.2 wt % to about 0.8 wt %.

Organic Acid

In addition to the at least one quaternary ammonium compound and the at least one film-forming polymer, the biocidal compositions of the present technology include at least one selected organic acid. Examples of organic acids that can be used include, but are not limited to, methanesulfonic acid, carboxylic acids, amino acids, or combinations thereof. Carboxylic acids that can be used as the organic acid include lactic acid, citric acid, acetic acid, gluconic acid, succinic acid, mandelic acid, adipic acid, or combinations thereof. More particularly, the carboxylic acid can be selected from the group consisting of lactic acid, citric acid, acetic acid, gluconic acid, succinic acid, mandelic acid, adipic acid, and combinations thereof. Amino acids that can be used as the organic acid include L-histidine, L-threonine, L-lysine, L-arginine, L-cysteine, or combinations thereof. More particularly, the amino acid can be selected from the group consisting of L-histidine, L-threonine, L-lysine, L-arginine, L-cysteine, or combinations thereof. In general, the at least one organic acid can be present in the biocidal compositions in an amount of about 0.5 wt % to about 6 wt %, alternatively about 0.6 wt % to about 6 wt %, alternatively about 0.7 wt % to about 5 wt %, alternatively about 0.8 wt % to about 4 wt %, alternatively about 0.9 wt % to about 3 wt %. The biocidal compositions have a pH in the range of about 1 to about 5, alternatively about 1 to about 4.

Surprisingly, it has been found that the wet abrasion durability of the biocidal compositions is improved when at least one selected organic acid is included in the composition. Without being bound by theory, it is suspected that certain organic acids are able to associate with the quaternary ammonium nitrogen via the carboxyl, yet still retain substantial un-dissociated acid structure. It is believed that, on drying, the organic acid forms an acid-quat complex that reduces water solubility and resists wet abrasion. For example, acetic acid, normally fully volatile, is retained in the surface film formed by drying a composition comprising the quaternary ammonium compound, film-forming polymer, and organic acid, and resists both dry abrasion and wet abrasion removal. Also surprisingly, it has been found that including an organic acid in a biocidal composition comprising a quaternary ammonium compound and a film-forming polymer having a permanent cationic charge can negatively affect the wet abrasion durability of the resulting dried surface film. For example, when a cationic starch is used as the film-forming polymer, the addition of an organic acid can decrease the wet abrasion durability of the dried film to unacceptable levels.

Liquid Carrier

The biocidal compositions of the present technology are in liquid form and comprise a carrier in addition to the quaternary ammonium compound, the film-forming polymer, and the organic acid. Water is a suitable carrier, particularly for a Ready-to-Use formulation, and can be de-ionized water, hard water, soft water, distilled water, tap water or combinations thereof. Water can be used alone as the carrier, or in combination with other suitable carriers, such as for example, water-miscible solvents, such as alcohols or glycol ethers. If a solvent, such as an alcohol, is used in the composition along with PVP as the film-forming polymer, the ratio of solvent to PVP is 3:1 or less. The liquid carrier typically comprises at least 40% by weight, based on the total weight of the composition, alternatively at least 50% by weight, alternatively at least 60% by weight.

The biocidal compositions of the present technology can include optional ingredients as known in the art. Such other components or additives can include pH adjustment agents, hydrotropic or other solubilizing agents for obtaining and maintaining a clear single phase concentrate or ready-to-use composition, electrolytes for enhancement of surfactant detergency, chelators for improvement of surfactant detergency and of cationic surfactant efficacy, fragrances for different attractive smells, dyes for pleasing color, preservatives, and other functional ingredients.

The biocidal compositions of the present technology can be prepared, for example, as a ready-to-use product or dilutable concentrate product. Whether in a ready-to-use form or a dilutable concentrate, the end use concentration of the components are equivalent.

As defined above, a dilutable concentrate product is a product that requires dilution with a diluent (e.g., water) in a ratio of about, for example, 1:32, 1:16 or 1:10 among others, before it can be applied to articles or surfaces to be biocidally treated or disinfected. In some embodiments, dilutable biocidal compositions are preferred as a cost saving and money saving option, which reduces packaging and shipping cost. In some embodiments, the concentrate may be diluted to the working concentration on site and packaged as a ready to use liquid or spray.

The diluent for diluting the concentrate form of the composition can be any diluent system known in the art. Examples of suitable diluents include, but are not limited to, water, glycols (preferably propylene glycol), alcohols (e.g., isopropanol, ethanol, methanol), other polar solvents known in the art, and mixtures thereof. Water is a preferred diluent of the presently described technology, and can be de-ionized water, hard water, soft water, distilled water, tap water or combinations thereof.

Standard blending equipment is acceptable for preparing the biocidal compositions of the present technology. Preparation, handling, and packaging precautions employed can be consistent with those established for quaternary ammonium-based formulations known in the art. The polymer is preferentially introduced first to provide an aqueous solution of any pH range for PVP, and acidified water for Chitosan.

In some embodiments of the present application, the biocidal composition is envisioned to be used as a spray. The biocidal composition may be used as a spray in an RTU formulation, or a concentrate formulation can be used as a spray using, for example, a 1:8, 1:10, or a 1:32 dilution of the biocidal composition. Delivery devices can include a trigger spray, aerosol spray, pump spray, or other delivery device, such as a mop, cloth, brush, etc. In some embodiments, the composition may be used in a wipe impregnated with the composition. In other embodiments, the composition may be used, for example, in a wipe used with an applicator pad. In some embodiments, the composition of the present application is envisioned to be a concentrate that can be packaged, for example, in a packet or pod that can be added to water at an appropriate dilution ratio.

Surprisingly, in some embodiments, the biocidal compositions of the present technology can form a peelable biocidal film that is both sturdy and flexible. In such embodiments, chitosan may be used as the film-forming polymer, and lactic acid, methanesulfonic acid, or a combination of methanesulfonic acid and L-Histidine may be used as the at least one organic acid. The peelable, flexible, biocidal films may have application in packaging, bags, labels, landscaping, photography, medical devices, such as gloves, or other uses where flexible films are desired.

The biocidal composition may be used to disinfect or sanitize a surface by applying a composition amount effective for disinfecting or sanitizing the surface, and allowing the composition to remain on the surface for a period of time. The composition may be applied to the surface, and subsequently wiped dry with a cloth, a wipe, a wiping device, or the like. Alternatively, the composition may be allowed to air dry. The dried composition provides a coating film on the treated surface that has biocidal properties and can kill bacteria within a 5 minute exposure time. The coating film can also withstand repeated touches and provide sustained biocidal efficacy, for example up to 24 hours after application, without imparting a sticky or gritty feel or poor visual effects, yet is sufficiently water soluble to allow removal of the film.

The biocidal compositions of the present technology have efficacy against a variety of different microorganisms, such as Gram positive bacteria and Gram negative bacteria. Examples of particular microorganisms that may be killed by the biocidal compositions include *Staphylococcus aureus* (*S. aureus*) and *Pseudomonas aeruginosa* (*P. aeruginosa*). Films formed from compositions of the present technology can provide greater than a 3.00 $\log_{10}$ reduction of microorganisms, based on guidance from Environmental Protection Agency (EPA) Protocol #01-1A "Residual Self-Sanitizing Activity on Hard, Non-Porous Surfaces", or other similar intent methods. In some embodiments, the films formed can provide greater than a 3.75 $\log_{10}$ reduction of Gram positive bacteria and greater than a 3.99 $\log_{10}$ reduction of Gram negative bacteria. Films formed from compositions of the present technology can kill at least 99% of microorganisms based on guidance from EPA Protocol #01-1A. In some embodiments the films formed can kill at least 99.9% of Gram positive and Gram negative bacteria based on guidance from EPA Protocol #01-1A.

The presently described technology and its advantages will be better understood by reference to the following examples. These examples are provided to describe specific embodiments of the present technology. By providing these specific examples, it is not intended to limit the scope and spirit of the present technology. It will be understood by those skilled in the art that the full scope of the presently described technology encompasses the subject matter defined by the claims appended to this specification, and any alterations, modifications, or equivalents of those claims.

EXAMPLES

Example 1: Durability Testing

Testing was performed to assess the surface durability properties of biocidal compositions comprising quaternary ammonium compounds as the biocidal agent. Samples of the following compositions were tested: Composition 1 comprised the quaternary ammonium compound (BTC® 835, available from Stepan Company) at 0.2 wt % of the active (0.4 wt % of the product as is). Composition 2 comprised 0.2 wt % active quaternary ammonium compound in combination with 0.2 wt % of a film-forming polymer, polyvinylpyrrolidone (PVP K90), having a molecular weight of about 1,000,000. Composition 3 comprised 0.2 wt % active quaternary ammonium compound and 4.0 wt % PVP film-forming polymer. Composition 4 comprised 0.2 wt % active quaternary ammonium compound in combination with 0.2 wt % of PVP, and 1 wt % of lactic acid (88% active) as the organic acid.

Surface durability of the biocidal compositions was assessed by a FTIR screening method simulating EPA Protocol #01-1A. In the screening method, reference ATR/FTIR spectra were obtained using 1% solutions of the respective materials dissolved in IPA, which were applied to the diamond crystal of the ATR unit on a Nicolet 6700 FTIR in the amount of 1 droplet from a disposable micro-pipet, then allowed to dry in place. Peaks were identified for C—H stretches of the quaternary ammonium biocides, carbonyl stretches of polymers and acids, and other relevant peaks. It was determined that the quaternary ammonium C—H stretch peaks were essentially free from interference due to the longer carbon chains of the quaternary ammonium materials, allowing for peak area quantification at each step.

As a benchmark, a leading commercial brand 24-hour anti-bacterial cleaner (cationic quaternary ammonium chlorides+citric acid+polyethyloxazoline+minor ingredients), was tested as-is, allowing 1 droplet from the disposable micro pipet to dry in place.

Ten cycles of manual dry abrasion consisted of slowly moving a weighted boat manually across the dried film followed by capturing a spectrum for analysis of remaining material on the ATR crystal. The boat is a Gardco straight line washability boat fitted with a damp/wrung out sponge wrapped with a dry cotton wipe (TexWipe Clean Cotton Wipers, VWR Cat. #TW-TX 309). Extra weight was added to the top of the fixture to bring it to 1060 grams for these studies.

Ten cycles of manual wet abrasion were then conducted with the same fixture and wipe, dampened directly on the external contact surface with 2 sprays from a 4 oz PET spray bottle from a distance of about 12 inches. A spectrum was then captured of the residue remaining after the 10 dry and 10 wet cycles of abrasion. A new cotton wipe is used for each sample tested.

The spectrum results are shown in FIGS. 1-4 and are used to determine the percentage of the residue remaining after the dry and wet abrasion cycles. The percentage of residue remaining can be calculated by determining the area under the relevant spectrum peaks for a spectrum captured before dry abrasion, after dry abrasion, and after wet abrasion, and comparing the peak areas from the spectra captured after abrasion to those of the spectrum captured before abrasion. The peak areas of the spectra can be determined by taking a screen recording of each spectrum and uploading the screen recording into a Tracker.jar program that analyzes the peaks and extracts the peak areas. The peak areas are then used to calculate the percentage of residue remaining. Abrasion durability results calculated from the spectra in FIGS. 1-4 are shown in Table 1, where the amounts in Table 1 represent the percentage of residue remaining after 10 dry or 10 wet cycles.

TABLE 1

| Sample | Initial | 10 Dry Abrasion Cycles | 10 Wet Abrasion Cycles |
|---|---|---|---|
| Composition 1 (BTC ® 835) | 100 | 56 | 0 |
| Composition 2 (BTC ® 835 + 0.2% PVP) | 100 | 81 | 70 |
| Composition 3 (BTC ® 835 + 4.0% PVP) | 100 | 65 | 67 |

TABLE 1-continued

| Sample | Initial | 10 Dry Abrasion Cycles | 10 Wet Abrasion Cycles |
|---|---|---|---|
| Composition 4 (BTC ® 835 + 0.2% PVP + Lactic) | 100 | 98 | 95 |
| Comparative commercial product | 100 | 90 | 70 |

The results in Table 1 show that the addition of 0.2 wt % of a PVP film-forming polymer can provide fairly comparable dry and wet abrasion durability to that of the comparative commercial brand 24-hour anti-bacterial cleaner. Increasing the amount of PVP polymer to 4.0 wt % did not improve the abrasion durability of the composition. The results also show that the addition of lactic acid significantly improves the dry and wet abrasion durability of the quaternary ammonium compositions, and provides better abrasion durability than the comparative commercial brand 24-hour anti-bacterial cleaner.

Example 2: Organic Acid Comparison

Figure 5:
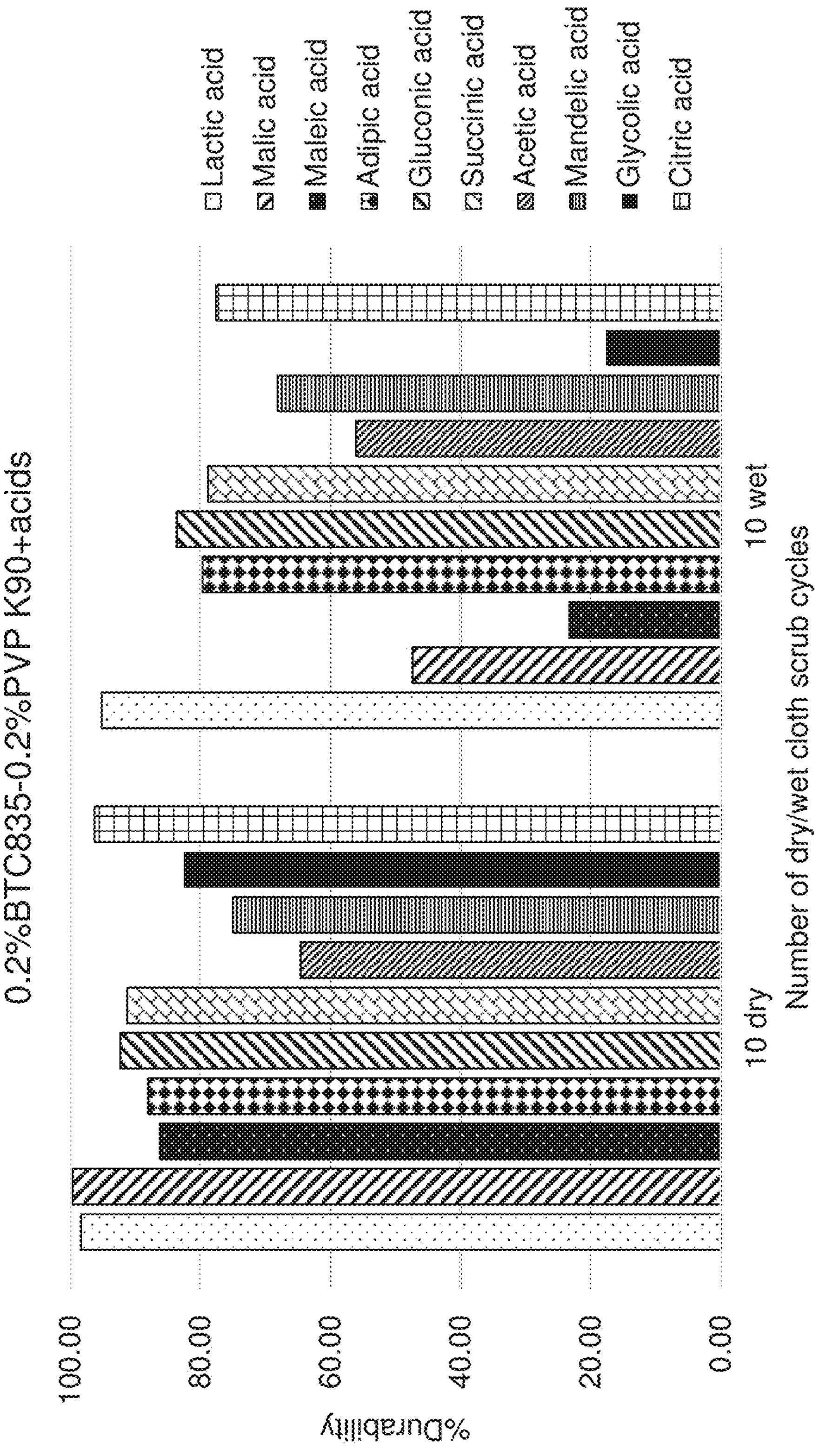
FIG. 5 is a graph showing the dry and wet abrasion test results of biocidal compositions of the present technology containing different carboxylic acids.
Figure 6:
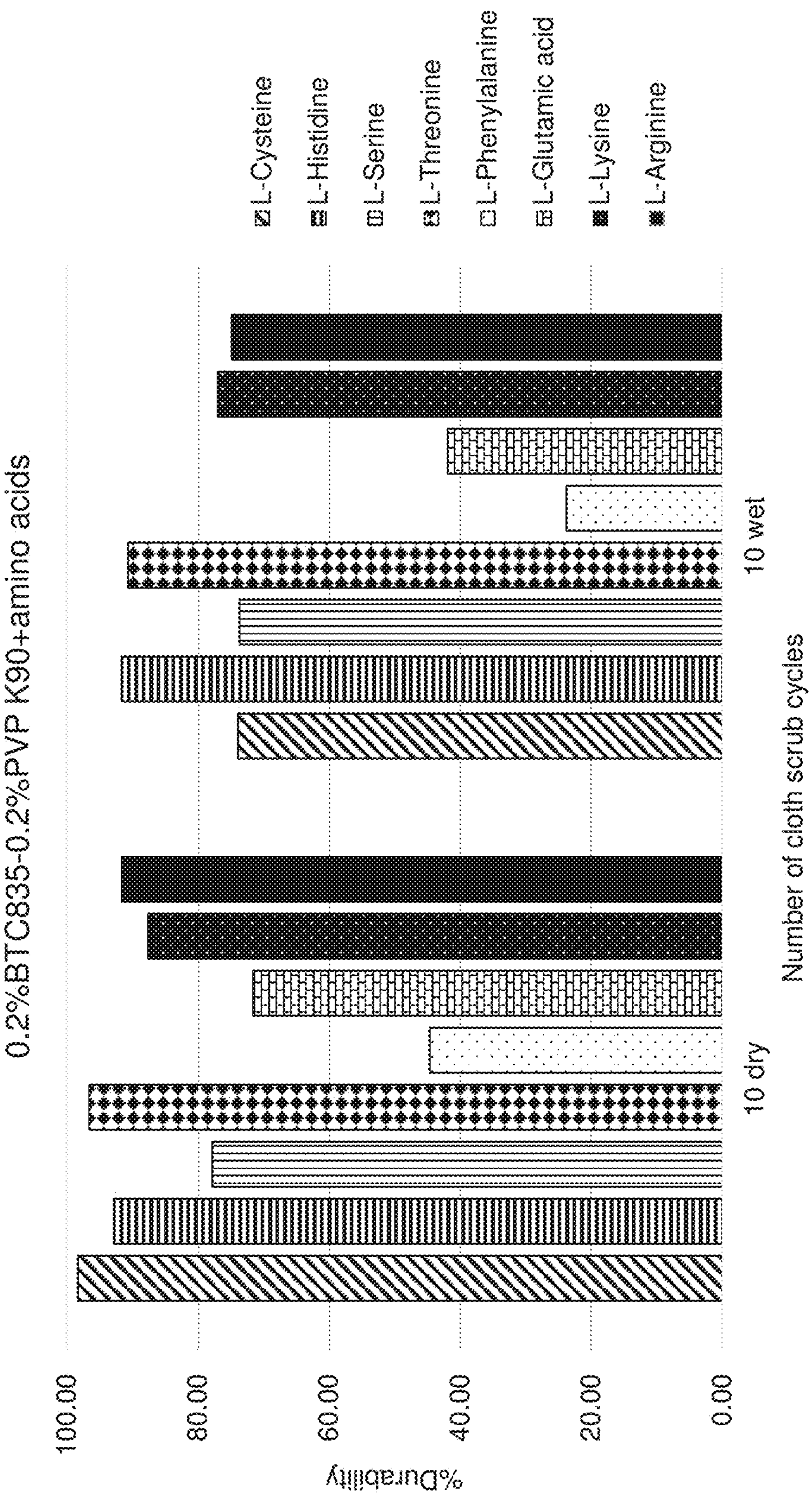
FIG. 6 is a graph showing the dry and wet abrasion test results of biocidal compositions of the present technology containing different amino acids.

Different carboxylic acids and amino acids as the organic acid were tested for their ability to provide enhanced abrasion durability to a biocidal formulation comprising quaternary ammonium compound and PVP. The carboxylic acids tested were lactic, malic, maleic, adipic, gluconic, succinic, acetic, mandelic, glycolic, and citric acids. The amino acids tested were L-cysteine, L-histidine, L-serine, L-threonine, L-phenylalanine, L-glutamic acid, L-lysine, and L-arginine. Each formulation comprised 0.2 wt % active quaternary ammonium compound (BTC® 835), 0.2 wt % PVP (PVP K90), and 1 wt % organic acid, in an aqueous carrier. Lactic acid used as the organic acid was 88% active, and the gluconic acid used was 50% active. The other organic acids used were 100% active. The formulations were tested using the same test procedure as Example 1. The carboxylic acids tested and the durability results for 10 dry abrasion cycles and 10 wet abrasion cycles are shown in FIG. 5, and the amino acids tested and the durability results for 10 dry abrasion cycles and 10 wet abrasion cycles are shown in FIG. 6. The amounts in the graph represent the percentage of residue remaining after 10 dry abrasion cycles or 10 wet abrasion cycles.

Compositions having at least 40% durability for both dry and wet abrasion cycles have acceptable durability. The graph in FIG. 5 shows that only particular organic acids are able to provide at least 40% durability for the dry and wet abrasion cycles. As shown in FIG. 5, lactic, adipic, gluconic, succinic, mandelic, and citric acids provided dry and wet durability of greater than 60%, with lactic and gluconic acids providing greater than 90% durability. The results in FIG. 5 also show that maleic and glycolic acids failed to provide wet durability results of at least 40%. These results demonstrate that carboxylic acids are not interchangeable in the compositions of the present technology. Similarly, the graph in FIG. 6 shows that only particular amino acids are able to provide at least 40% durability for the dry and wet abrasion cycles. As shown in FIG. 6, L-cysteine, L-histidine, L-serine, L-threonine, L-lysine, and L-arginine are able to provide durability results well above 40% for the dry and wet abrasion cycles, while L-glutamic acid is borderline for wet abrasion durability, and L-phenylalanine failed to provide acceptable wet durability. The results in FIGS. 5 and 6 show that particular carboxylic or amino acids are able to provide both enhanced dry abrasion durability and wet abrasion durability, whereas other carboxylic acids and amino acids are not.

Example 3: Chitosan Polymer

Quaternary ammonium biocidal compositions were prepared in which medium molecular weight chitosan was used as the film-forming polymer, and different dilute acids were used to solubilize the chitosan. Composition A comprised 0.2 wt % active quaternary ammonium compound (BTC® 835), 0.2 wt % medium molecular weight chitosan, and 2 wt % hydrochloric acid (HCl)(0.1 N), and Composition B comprised 0.2 wt % active quaternary ammonium compound (BTC® 835), 0.2 wt % medium molecular weight chitosan, and 2 wt % lactic acid (88% active). The compositions were tested for durability using the Example 1 test procedure. The percentage amount of residue remaining after 10 dry abrasion cycles and 10 wet abrasion cycles for each sample is shown in Table 2.

TABLE 2

| Sample | Initial | 10 Dry Abrasion Cycles | 10 Wet Abrasion Cycles |
|---|---|---|---|
| Composition A (BTC ® 835 + Chitosan + HCl) | 100 | 73 | 0 |
| Composition B (BTC ® 835 + Chitosan + Lactic) | 100 | 100 | 97 |

The results in Table 2 show that an organic acid, such as lactic acid, provides wet abrasion durability for a composition comprising a quaternary ammonium compound as the biocidal active and chitosan as the film-forming polymer, whereas an inorganic acid, such as HCl, provides no wet abrasion durability.

Example 4: Chitosan Polymer Organic Acid Amount

Quaternary ammonium biocidal compositions were prepared in which 0.2 wt % medium molecular weight chitosan (90% deacetylated) was used as the film-forming polymer, and different amounts of lactic acid (88% active), 0.5 wt %, 1 wt %, and 2 wt %, were used to solubilize the chitosan. Each of the compositions contained 0.2 wt % active quaternary ammonium compound. The compositions were tested for abrasion durability using the Example 1 test procedure. The results are shown in Table 3.

TABLE 3

| Sample | Initial | 10 Dry Abrasion Cycles | 10 Wet Abrasion Cycles |
|---|---|---|---|
| BTC 835 ® + Chitosan + 0.5% as-is lactic acid (88% active) | 100 | 48 | 31 |
| BTC 835 ® + Chitosan + 1% as-is lactic acid (88% active) | 100 | 100 | 67 |
| BTC 835 ® + Chitosan + 2% as-is lactic acid (88% active) | 100 | 88 | 84 |

The results in Table 3 show that, for this embodiment, lactic acid in an amount of 0.5 wt % may not be sufficient to provide wet abrasion durability of at least 40%. However, increasing the amounts of lactic acid to 1% and 2% lactic acid was effective for providing acceptable dry and wet abrasions durability. The results also show that 2 wt % lactic acid provides improved wet abrasion durability compared to 1 wt % lactic acid in this embodiment.

Example 5: Alternative Quaternary Ammonium Compounds and Chitosan

Biocidal compositions containing different quaternary ammonium compounds and chitosan as the film-forming polymer were prepared and tested for dry abrasion and wet abrasion durability. The quaternary ammonium compounds were BTC® 835, n-alkyl dimethyl benzyl ammonium chloride (alkyl 50% C14, 40% C12, 10% C16), and BTC® 885, a blend of n-alkyl dimethyl benzyl ammonium chloride and dialkyl dimethyl ammonium chloride, both available from Stepan Company, Northfield, Illinois. Each composition comprised 0.2 wt % active quaternary ammonium compound, 0.2 wt % medium molecular weight chitosan (90% deacetylated), and 2 wt % lactic acid (88% active). The compositions were tested for abrasion durability using the Example 1 test procedure. The results, representing the percentage of residue remaining, are shown in Table 4.

TABLE 4

| Sample | Initial | 10 Dry Abrasion Cycles | 10 Wet Abrasion Cycles |
|---|---|---|---|
| Composition A (BTC ®835 + Chitosan + Lactic) | 100 | 88 | 84 |
| Composition B (BTC ® 885 + Chitosan + Lactic) | 100 | 77 | 49 |

The results show that the composition comprising BTC® 835 quaternary ammonium compound in combination with chitosan and 2 wt % as-is lactic acid (88% active) has better dry abrasion and wet abrasion durability than the composition comprising the BTC® 885 blend of quaternary ammonium compounds. However, acceptable dry abrasion durability is still obtained with the quaternary ammonium compound blend.

Example 6: Alternative Quaternary Ammonium Compounds

Biocidal compositions containing different quaternary ammonium compounds were prepared and tested for dry abrasion and wet abrasion durability. The quaternary ammonium compounds in the different compositions were BTC® 835, n-alkyl dimethyl benzyl ammonium chloride (alkyl 50% C14, 40% C12, 10% C16), BTC® 885, a blend of n-alkyl dimethyl benzyl ammonium chloride and dialkyl dimethyl ammonium chloride, and BTC® 2125M, a blend of n-alkyl dimethyl benzyl ammonium chloride and n-alkyl dimethyl ethylbenzyl ammonium chloride, all available from Stepan Company, Northfield, Illinois. Each composition comprised 0.2 wt % active quaternary ammonium compound, 0.2 wt % PVP K90, and 1 wt % as-is gluconic acid (50% active). The compositions were tested for abrasion durability using the Example 1 procedure. The results, representing the percentage of residue remaining, are shown in Table 5.

TABLE 5

| Sample | Initial | 10 Dry Abrasion Cycles | 10 Wet Abrasion Cycles |
|---|---|---|---|
| BTC ® 835 + PVP K90 + 1% gluconic acid | 100 | 92 | 81 |
| BTC ® 885 + PVP K90 + 1% gluconic acid | 100 | 72 | 69 |
| BTC ® 2125M + PVP K90 + 1% gluconic acid | 100 | 62 | 55 |

The results show that compositions comprising different quaternary ammonium compounds can provide acceptable dry abrasion and wet abrasion durability.

Example 7: Efficacy Testing Against *S. aureus* ATCC 6538

Biocidal compositions were prepared and tested for biocidal efficacy against *S. aureus* ATCC 6538. A leading commercial brand 24-hour anti-bacterial bathroom cleaner was used as a comparative. Efficacy was determined following guidance from EPA Protocol #01-1A "Residual Self-Sanitizing Activity on Hard, Non-Porous Surfaces". 1×1 inch test surfaces were washed, sterilized, and inoculated with 10 microliters of the test inoculum with 5% organic soil and dried for 30-35 minutes. Each test formulation was then micropipetted directly onto the inoculated surface of a coupon in an amount of 0.7 mL per surface and allowed to dry in ambient conditions. A 5-minute residual test was conducted on samples that did not undergo abrasion and re-inoculation cycles to determine baseline efficacy (Table 6, Test A). For samples that underwent abrasion and re-inoculation cycles, each coupon was exposed to a total of 12 alternating dry and wet abrasion cycles, each cycle consisting of a back and forth motion across the coupon with a standardized abrasion machine and cotton facing boat assembly. For wet cycles, the sample-facing cotton cloth was sprayed with sterile water, using a Preval sprayer, from a distance of 75±1 cm for approximately 1 second and used immediately. 12 re-inoculations of test inoculum and soil were applied to the surface between cycles and allowed to dry for 30-35 minutes at ambient room conditions. After the full abrasion and re-inoculation cycles were completed, and after 24 hours had passed since the initial application of the test formulation to the coupon, a 5-minute residual test efficacy test was conducted with 10 microliters of inoculum with 5% soil load (Table 6, Test B). The formulations for the experimental biocidal compositions and the efficacy results are shown in Table 6.

TABLE 6

| Formulation | Test A 0 Dry + 0 Wet Cycles 0 Re-Inoculation Cycles | | Test B 6 Dry + 6 Wet Cycles 12 Re-Inoculation Cycles | |
|---|---|---|---|---|
| | $Log_{10}$ Reduction | % Reduction | $Log_{10}$ Reduction | % Reduction |
| BTC ® 2125 (0.3% active) + 1% PVP K90 | 2.53 | 99.70% | 0.63 | 76.63% |
| BTC ® 885 (0.2% active) + 0.8% chitosan + 2% as-is lactic (88% active) | >3.71 | >99.98% | >3.75 | >99.98% |
| BTC ® 885 (0.8% active) + 0.8% chitosan + 2% as-is lactic (88% active) | >3.71 | >99.98% | >3.75 | >99.98% |
| BTC ® 885 (0.2% active) + 0.4% chitosan + 4% as-is gluconic (50% active) | >3.71 | >99.98% | >3.75 | >99.98% |
| Commercial 24-hour bathroom cleaner (comparative) | >3.71 | >99.98% | >3.75 | >99.98% |

Passing criteria: ≥3.00 (≥99.9%)

The results show that the formulations prepared with medium molecular weight chitosan (about 90% deacetylated) as the film-forming polymer provided the treated surface with residual efficacy against *S. aureus*. In addition, the formulations prepared with chitosan provided surface films with no tackiness, whereas the comparative commercial brand 24-hour anti-bacterial cleaner provided surface films that showed tackiness.

Example 8: Efficacy Testing Against *P. aeruginosa* ATCC 15442

Biocidal compositions were prepared and tested for biocidal efficacy against *P. aeruginosa* ATCC 15442. A leading commercial brand 24-hour anti-bacterial bathroom cleaner, a commercial brand disinfecting spray cleaner with 24-hour claims, and a commercial non-24-hour disinfecting spray cleaner, were used as comparatives. A biocidal quaternary ammonium (BTC® 2125) formulation without a film-forming polymer was also tested. Efficacy was determined according to same procedure used in Example 7. Sample retention was determined by mass measurements before and after product application and abrasions. Tackiness was determined by gloved finger touch. Film formation was determined visually. The formulations for the experimental biocidal compositions and the efficacy results are shown in Table 7.

TABLE 7

| Formulation | Sample Observations: Sample Retention | Sample Observations: Tackiness Level | Sample Observations: Film Formation | Test A 0 Dry + 0 Wet Cycles 0 Re-Inoculation Cycles: $Log_{10}$ Reduction | Test A: % Reduction | Test B 6 Dry + 6 Wet Cycles 12 Re-Inoculation Cycles: $Log_{10}$ Reduction | Test B: % Reduction |
|---|---|---|---|---|---|---|---|
| BTC ® 885 (0.2% active) + 0.8% chitosan + 2% as-is lactic (88% active) | High | None | Yes | >3.99 | >99.99% | >3.96 | >99.99% |
| BTC ® 885 (0.8% active) + 0.8% chitosan + 2% as-is lactic (88% active) | High | None | Yes | >3.99 | >99.99% | >3.96 | >99.99% |
| BTC ® 885 (0.2% active) + 0.4% chitosan + 4% as-is gluconic (50% active) | High | None | Yes | >3.99 | >99.99% | >3.96 | >99.99% |
| BTC ® 2125 (about 0.3% active) | Med | None | No | >3.99 | >99.99% | 0.07 | 14.89% |
| 24-hour anti-bacterial bathroom cleaner | High | High | Yes | >3.99 | >99.99% | >3.96 | >99.99% |
| 24-hour disinfecting spray cleaner | Low | None | No | >3.99 | >99.99% | 0.93 | 88.25% |
| Non-24 hour disinfecting spray cleaner | Low | None | No | 1.37 | 95.73% | 0.00 | 0.00% |

Passing criteria: ≥3.00 (≥99.9%)

The results show that the formulations prepared with medium molecular weight chitosan (about 90% acetylated) as the film-forming polymer provided the treated surface with residual efficacy against *P. aeruinosa*. The formulations that did not form films failed to provide efficacy after abrasion testing. Although the leading commercial brand 24-hour anti-bacterial bathroom cleaner showed passing efficacy after the abrasion testing, the surface films had a high degree of tackiness, whereas the formulations prepared with chitosan provided surface films with no tackiness as well as passing efficacy after abrasion testing.

Example 9: Alternative Film-Forming Polymers (Comparative)

Quaternary ammonium biocidal compositions were prepared in which alternative, cationic film-forming polymers were used as the film-forming polymer. The film-forming polymers were Sta-Lok® 330, a cationic starch polymer available from Tate & Lyle, and UCARE polymer JR-30M, a hydroxyethylcellulose ethoxylate quaternized polymer available from Dow. Compositions were prepared with and without added organic acid to assess the effect of the organic acid on abrasion durability performance of the dried composition. Compositions 1 and 2 comprised 0.4 wt % active quaternary ammonium compound (BTC® 835), and 1 wt % of the cationic starch, with Composition 2 containing 2 wt % as-is lactic acid. Compositions 3 & 4 comprised 0.4 wt % active quaternary ammonium compound (BTC® 835), and 1 wt % of the UCARE polymer, with Composition 4 containing 2 wt % as-is lactic acid. The compositions were tested for dry and wet abrasion durability using the Example 1 procedure. The results are shown in Table 8.

TABLE 8

| Sample | 10 Dry Abrasion Cycles | 10 Wet Abrasion Cycles |
|---|---|---|
| Composition 1 (BTC ® 835) + 1 wt % starch | 89 | 68.8 |
| Composition 2 (BTC ® 835 + 1 wt % starch + 2% lactic | 100 | 49.7 |
| Composition 3 (BTC ® 835 + 1 wt % UCARE | 88 | 58 |
| Composition 4 (BTC ® 835 + 1 wt % UCARE + 2% lactic) | 114 | 21 |

The results in Table 8 show that the compositions comprising a cationic film-forming polymer had acceptable dry and wet abrasion durability. The results also show that adding an organic acid to the compositions actually harmed rather than enhanced the wet durability of the compositions.

The term "consisting essentially of" means the identified component and additional components that do not materially affect the basic and novel properties of the component or composition containing the component. Here, the basic and novel properties include the ability to form films that provide dry and wet abrasion durability of at least 40%, residual biocidal properties for at least 12 hours, and do not impart a gritty, sticky, or tacky feel.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

What is claimed is:

1. A biocidal composition comprising:

(a) 0.05 wt % to 30 wt % of at least one biocidal quaternary ammonium compound;

(b) 0.05 wt % to 5 wt % of a polymer component consisting of a film-forming polymer, wherein the film-forming polymer is chitosan or polyvinylpyrrolidone having a molecular weight in the range of 1,000,000 to 1,700,000 g/mol and a K value in the range of 80 to 100;

(c) 0.6 wt % to 6 wt % of an organic acid component, wherein the organic acid component is at least one of methanesulfonic acid, carboxylic acid, or amino acid, wherein the carboxylic acid is selected from the group consisting of lactic acid, gluconic acid, succinic acid, citric acid, adipic acid, and combinations thereof, and the amino acid is selected from the group consisting of L-Cysteine, L-Threonine, L-Serine, L-Lysine, L-Arginine, L-Histidine, and combinations thereof; and (d) a liquid carrier to 100 wt % of the composition.

2. The composition of claim 1, wherein the quaternary ammonium compound has the following chemical formula:

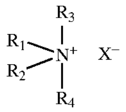

$R_1$ is a straight or branched, saturated or unsaturated, alkyl or alkene chain having from 6 to 22 carbon atoms;

$R_2$ is a straight or branched, saturated or unsaturated, alkyl or alkene chain having from 1 to 16 carbon atoms;

$R_3$ is methyl, ethyl, benzyl or ethylbenzyl;

$R_4$ is methyl or ethyl; and $X^-$ is: $Cl^-$, $Br^-$, $F^-$, $I^-$, $(SO_4^{2-})_{\frac{1}{2}}$, $CH_3OSO_3^-$, $HCO_3^-$, $CO_3^{2-}{}_{\frac{1}{2}}$, $CH_2COO^-$, or $C_7H_4NO_3S^-$.

3. The composition of claim 1, wherein the quaternary ammonium compound is selected from the group consisting of alkyl dimethyl benzyl ammonium chloride, dialkyl dimethyl ammonium chloride, and combinations thereof.

4. The composition of claim 1, wherein the quaternary ammonium compound comprises from 0.1 wt % to 30 wt % of the composition.

5. The composition of claim 1, wherein the chitosan has a degree of de-acetylation of at least 60%.

6. The composition of claim 1, wherein the chitosan is solubilized with an organic acid.

7. The composition of claim 6, wherein the organic acid for solubilizing the chitosan is selected from the group consisting of lactic acid, citric acid, acetic acid, gluconic acid, succinic acid, mandelic acid, adipic acid, methanesulfonic acid, and combinations thereof.

8. The composition of claim 1, wherein the organic acid component is lactic acid or gluconic acid.

9. The composition of claim 1, wherein the organic acid component is methanesulfonic acid.

10. The composition of claim 1, wherein the composition has a pH of 1 to 5.

11. The composition of claim 1, wherein a film formed from the composition can provide at least a 3 $\log_{10}$ reduction of microorganisms in accordance with guidance from Environmental Protection Agency (EPA) Protocol #01-1A Residual Self-Sanitizing Activity on Hard, Non-Porous Surfaces.

12. The composition of claim 1, wherein a film formed from the composition can provide at least a 3.75 $\log_{10}$ reduction of Gram positive and Gram negative bacteria in accordance with guidance from EPA Protocol #01-1A Residual Self-Sanitizing Activity on Hard, Non-Porous Surfaces.

13. The composition of claim 1, wherein a film formed from the composition can kill at least 99.9% of Gram positive and Gram negative bacteria in accordance with guidance from EPA Protocol #01-1A Residual Self-Sanitizing Activity on Hard, Non-Porous Surfaces.

14. A method of disinfecting a surface comprising the steps of applying to the surface an effective amount of a biocidal composition according to claim 1, and allowing the composition to remain on the surface to form a film on said surface.

15. The method of claim 14, wherein the composition is applied by spraying the composition on the surface.

16. The method of claim 14, wherein the composition is applied by wiping the surface with a wipe that is impregnated with the composition.

17. The composition of claim 1, wherein the film-forming polymer consists of chitosan.

* * * * *